Feb. 16, 1932. S. S. COOK 1,845,240
DEMONSTRATION SET
Filed June 17, 1929 4 Sheets-Sheet 3
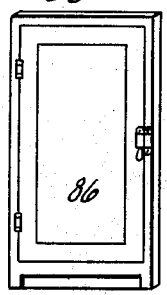
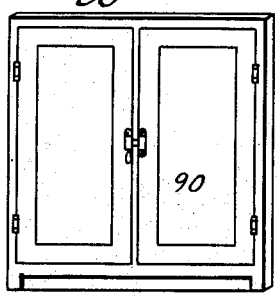
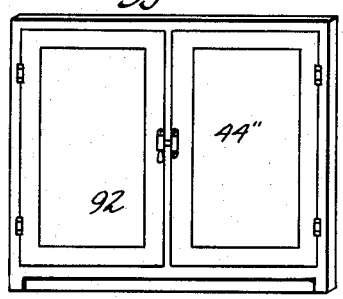
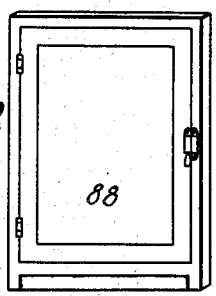
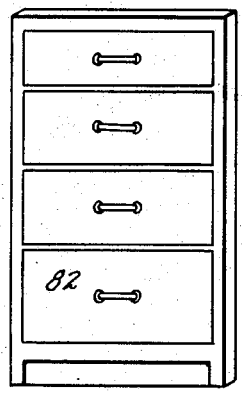
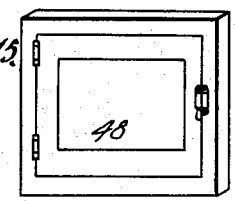
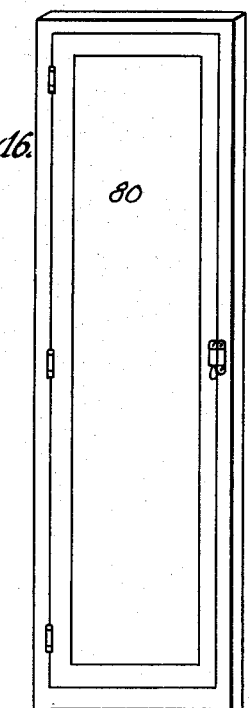
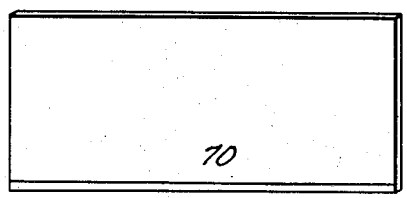
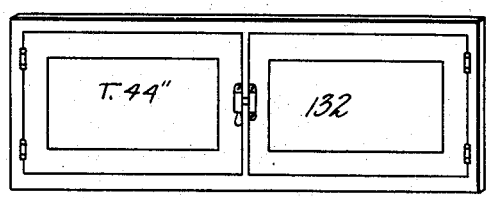

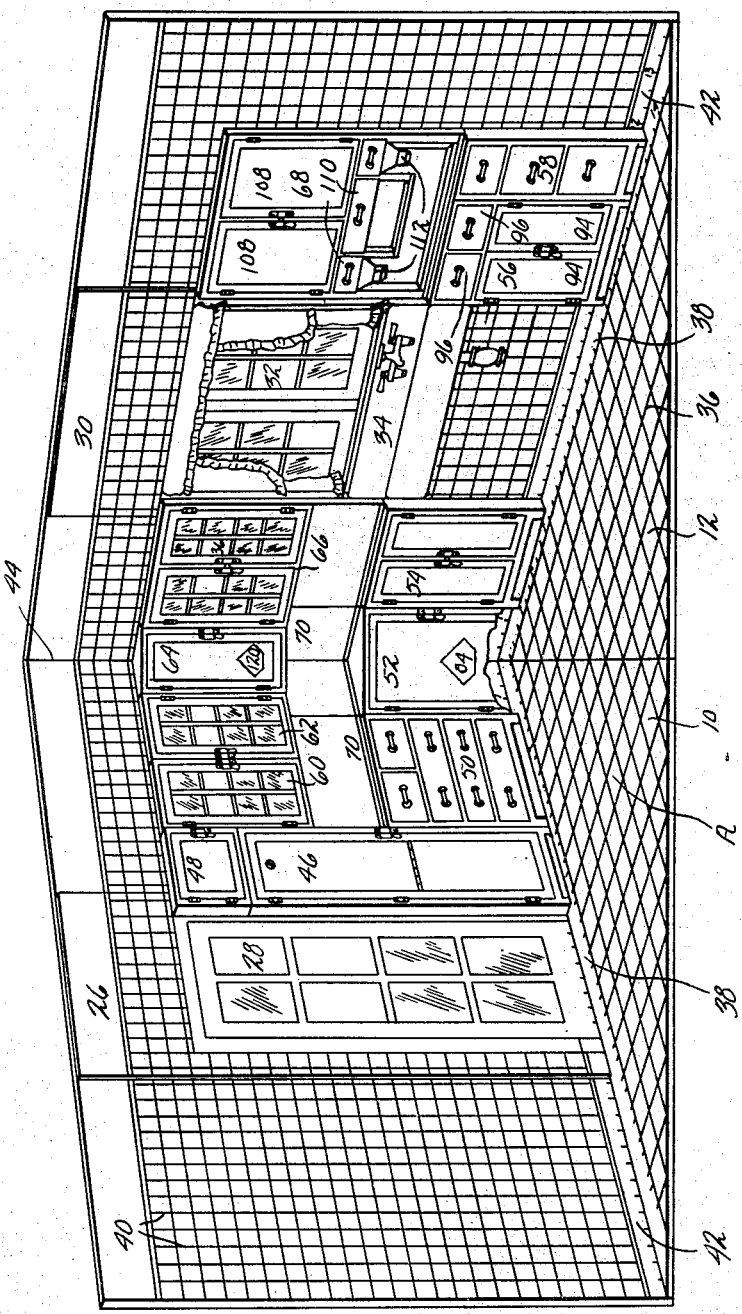

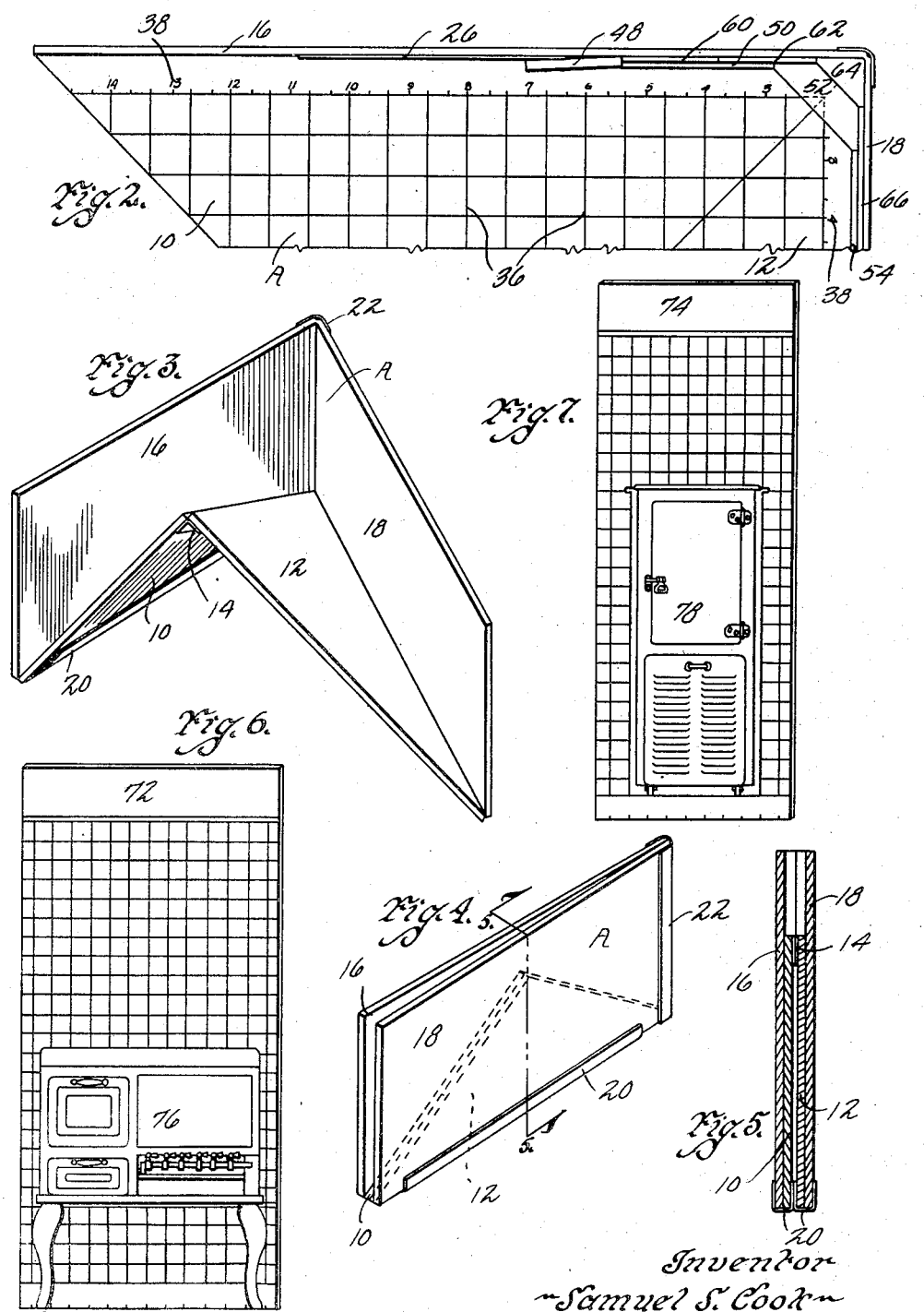

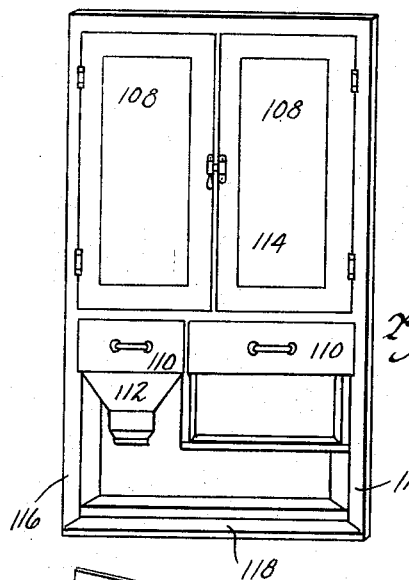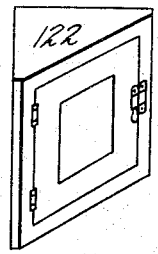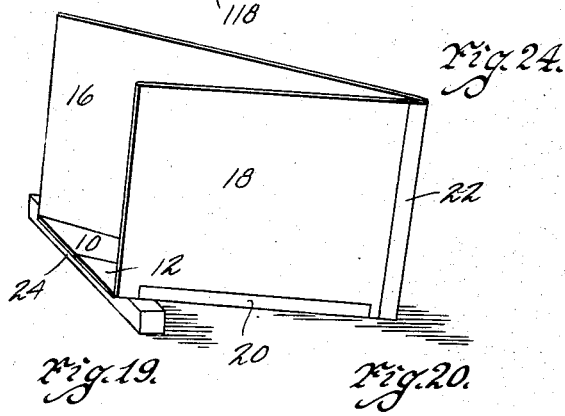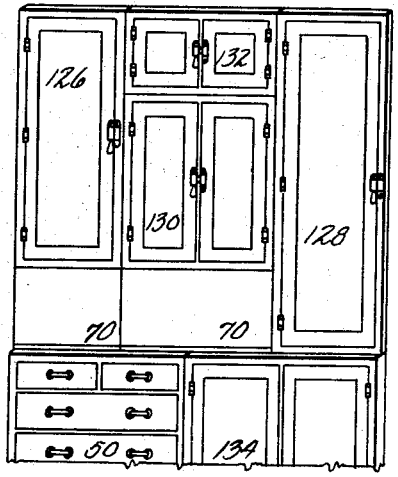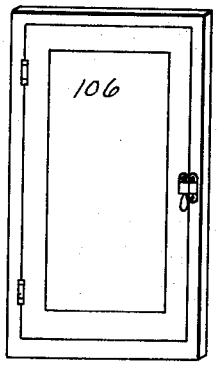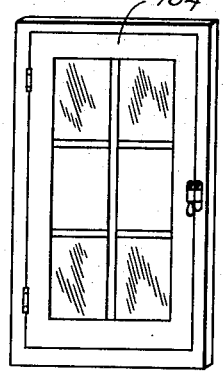

Patented Feb. 16, 1932

1,845,240

UNITED STATES PATENT OFFICE

SAMUEL S. COOK, OF CLINTON, IOWA, ASSIGNOR TO CURTIS COMPANIES, INC., OF CLINTON, IOWA

DEMONSTRATION SET

Application filed June 17, 1929. Serial No. 371,569.

The object of my invention is to provide a demonstration set consisting of apparatus to represent a portion of a room and objects to represent articles in the room, the objects being movable relative to the room whereby a pictorial view may be arranged in any desired form, the parts of the set being simple, durable and the set being of comparatively inexpensive construction.

A further object is to provide a device representing the corner of a room, the device consisting of two wall members and a floor member, these members being hinged together and the floor member consisting of two parts hinged together, whereby the device may be conveniently folded and placed in a box for containing the set without taking up much room.

Still a further object is to provide included in the set a plurality of blocks or thick cards adapted to represent objects, such as cabinets for instance, these objects being made to scale with the exception of thickness, whereby the objects may be conveniently packed in the container box. It will be obvious that if the objects were made to the proper thickness scale, the container for the set would have to be much larger.

More particularly it is my object to provide a demonstration set representing a portion of the floor and two walls of a kitchen with cards or sheets of papers representing doors, windows and the like, all of which are made to scale whereby the doors and windows may be placed in the proper position to represent a given kitchen and whereby the resulting wall space is blank, a plurality of flat blocks or thick cards being included in the set and representing cabinets of various heights, widths and constructional characteristics adapted to be placed against the blank walls of the represented room, and arranged to best advantage in the blank wall space. Thus, many different combinations may be worked out and the pictorial effect readily seen before the cabinets are purchased and installed in the kitchen. The set, of course, can be designed for use with objects other than cabinets and the room may represent rooms other than kitchens.

A further object is to provide a convenient scale to determine aggregate widths of the flat blocks and for positioning the cards along the wall.

Still a further object is to provide triangular corner blocks (which are not to scale) where it is desirable to build cabinets around the corner of the room and to provide a secondary scale to compensate for the difference between the actual depth of the flat and corner blocks and the represented depths thereof, whereby aggregate depths of the corner blocks added to the widths of the flat blocks may be determined even though both the sizes of the corner blocks and the depths of the flat blocks are not to scale.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of the device representing a portion of the floor and two walls of a kitchen or the like, and showing an arrangement of cabinets therein as represented by the blocks of the set.

Figure 2 is a plan view of a portion of Figure 1.

Figure 3 is a perspective view of the device representing the floor and walls in a partially folded position.

Figure 4 illustrates them in completely folded position.

Figure 5 is a sectional view on the line 5—5 of Figure 4.

Figure 6 is a card representing a stove.

Figure 7 is a card representing a refrigerator.

Figures 8, 9, 10, 11, 12 and 13 are perspective views of various blocks used in the set to represent cabinets adapted to be positioned on the floor of the room.

Figure 14 is a perspective view of a block adapted to act as a spacer and represent a blank wall space.

Figures 15 and 16 are perspective views of cabinets, Figure 15 being adapted to be placed on top of Figure 16.

Figure 17 is a view of a storage cabinet adapted to be placed on top of other cabinets on the floor.

Figure 18 is a perspective view of a block representing a top cabinet of the kitchen cabinet type.

Figures 19 and 20 are perspective views of upper storage cabinets, the latter being of the type having glass doors.

Figures 21 and 22 are perspective views of corner cabinets adapted to be placed in the corner of the wall.

Figure 23 is a perspective view of an arrangement of cabinets different than the arrangements shown in Figure 1; and Figure 24 is a perspective view of the device representing the floor and walls of a kitchen arranged in a tilting position so that the cabinet blocks when placed against the walls thereof will remain in such position instead of tipping forward.

On the accompanying drawings I have used the reference character A to indicate generally a device representing a portion of a floor and two walls of a kitchen. The device A consists of a pair of floor members 10 and 12 hinged together as indicated at 14. A pair of wall members 16 and 18 are included in this device and the lower edges of the wall members 16 and 18 are hinged as indicated at 20 to the side edges of the floor member 10 and 12. The adjacent edges of the wall members 16 and 18 are hinged together as indicated at 22. The device A may be folded from the position shown in Figure 1 to the position shown in Figure 4. In the folding operation it will assume the intermediate position shown in Figure 3. It will be noted that the floor members 10 and 12 fold against each other and between the wall members 16 and 18. This is also clearly shown in Figure 5 of the drawings. The purpose of this is so that the device may be placed in a comparatively small box when the demonstrator carries it from one place to another.

In the use of the demonstration set, the device A may be tipped by placing the forward edge thereof on a block 24 or on the edge of the carrying box for the set, if desired. This tips both walls 16 and 18 backwardly so that the various blocks when placed against the walls will remain thereagainst by gravity.

The floor members 10 and 12 are each provided with cross lining 36 and with a pair of graduated scales 38, the purpose of which will hereinafter be fully described. It may here be mentioned, however, that the cross lining 36 is made to represent 8 inch squares and in the actual set may be colored to look like linoleum. The wall members 16 and 18 are cross lined as indicated at 40 and represent 4 inch squares. The wall members 16 and 18 are each provided with a graduated scale 42, (Fig. 1).

My demonstration set includes a sheet of paper 26 having represented thereon a door 28 and a sheet of paper 30 having represented thereon a window 32 and a sink 34. The sheets 26 and 30 may be of thin cardboard.

The door 28 and window 32 are placed a certain distance from the corner 44 of the room and this distance is determined by first measuring the distance in an actual room to be represented by the demonstration set, and then placing the cards 26 and 30 at the proper position determined by the graduated scales 42 or the cross lining 40 (each line indicating 4 inches) or using both the scale and cross lining if desired. Thus, two walls and a corner of the kitchen are represented in the demonstration set and the actual blank wall space to scale is represented.

This wall space may now be filled with the cabinet blocks which may be arranged in any form desired or found feasible. In Figure 1 for instance, I have illustrated a broom closet 46 with an ironing board insert in the door thereof. Above the broom closet 46 I have illustrated a broom closet top section 48. It will be noted that these two closets are on thick cardboard and in the actual set they represent a depth of 22 inches. Other cabinets of this same depth are illustrated as follows: base drawer section 50, base shelf section 54, base pan section 56, and bread drawer section 58. For use with the base row of blocks I provide a base corner 52.

My demonstration set includes other blocks of thinner construction and adapted to illustrate cabinets of 14 inch depth (this statement does not constitute a limitation to the dimensions herein stated which are only by way of illustration).

A plurality of these thinner blocks are illustrated as follows: glass door storage sections 60 and 62, glass door storage section 66, and mid-section 68. For use with the upper row of blocks I provide a storage corner 64. The corner blocks 52 and 64 need not be to scale as will hereinafter be obvious. In the majority of installations it is desirable to space the shallow cabinets above the upper surface of the deep cabinets whereby a work table space is provided between the bottom of the upper cabinets and on the tops of the lower cabinets.

I provide for representing this space by the use of side wall members 70. The mid-section 68 is already provided with a compartment to serve this purpose. After two walls of a room have been represented and worked out as to just what cabinets should be built in the other two walls of the room are treated in a similar manner. Against the other two walls a stove and a refrigerator may possibly be positioned and the pictorial view of a room with these objects in them may be represented by using the cards 72 and 74 having a stove 76 and a refrigerator 78 illustrated thereon respectively. Dimensions may be placed on the four cards 26, 30, 72 and 74 and in the event that the actual object represented by them happens to be wider than the scaled width of the device shown on the cards, the cabinet blocks may be made to overlap the cards as for instance, the cabinets 46 and 48 overlap the door 28 as shown in Figure 1.

Referring more specifically to the cards 26, 30, 72 and 74, the card 26 may have the size of the door 28 printed thereon as illustrated in Figure 1. The card 30 may have the size of the window printed thereon and the dimensions of the sink 34. The card 72 may have the width and height of the stove 76 printed thereon. The card 74 may have the width and height of the refrigerator 78 printed thereon. Referring more specifically to the blocks representing the cabinets, the cabinet 46 may have a legend printed thereon, such as Br. 20″, I. B. 20″ for instance, for broom closet 20 inches wide with an ironing board insert 20 inches wide. This cabinet may have further dimensions such as 20″ x 64″ x 22″, referring to width, height and depth. The set will also include broom closets without ironing boards as illustrated by the block 80 shown in Figure 16. The legend on the block 80 refers to a broom closet 18 inches wide. In the actual set this block, as well as all of the others, will have the width, height and depth printed thereon, such as 18″ x 64″ x 22″ in the case of the block 80. Other widths of broom closets may also be included in the set and it is usually desirable to have two of each width, as in some installations two broom closets of the same width are used for symmetry, and one of them may be used for storage purposes. The block 48 representing a broom closet top section may be provided in other widths such as 18 inches as shown in Figure 5.

The base drawer section 50 shown in Figure 1 may be supplemented in the demonstration set with base drawer sections of other width, such as the block 82 shown in Figure 12 and which is 20 inches wide. This drawer section shows a plurality of drawers, each of which is single, while the wider base drawer section 50, shown in Figure 1, is provided with two drawers at the top. The storage corner 52 is always of the same size and is preferably provided with a diagram 84 illustrating the true size of the actual cabinet represented by the block 52.

The base shelf section 54 may be supplemented with base shelf sections of different widths, such as the blocks 86, 88, 90 and 92 shown in Figures 8 to 11 inclusive. These blocks are shown to illustrate the various widths of base shelf sections, the narrowest of which are provided with single doors instead of double doors. The demonstration set preferably includes quite a number of the base shelf sections as a greater percentage of these are used in an installation than other types of deep cabinets.

The base pan section 56 is provided with a pair of doors 94 and drawers 96. This block may be supplemented by others of different widths, such as the block 98 shown in Figure 13 and provided with a single door 100 and a single drawer 102. The blocks 56 and 98 represent cabinets in which pan racks are provided in the lower part.

The upper or thin sections, such as the glass door storage sections 60 and 62 may be supplemented with blocks 104 of different widths, some of which may be double as illustrated at 66. These sections are identical with other storage sections represented by blocks 106 shown in Figure 19, but do not have glass in the doors. The mid-section 68 is provided with doors 108 in their upper part, drawers 110 below the doors 108 and discharge spouts 112 representing the discharge spouts for flour and sugar or the like, to be found in ordinary kitchen cabinets. It will be noted that the blocks 60, 62, 64 and 66 are held spaced above the blocks 50, 52 and 54 by side wall blocks 70. A plurality of these are included in the set of different lengths, Figure 14 showing one representing a side wall 36 inches long. The blocks 68 will be supplemented by additional similar blocks such as the block 114 shown in Figure 18 which has but one spout 112. The blocks 68 and 114 each have side wall members 116 and a bottom member 118 (by representation) thus making the block long enough to dispense with a side wall spacer 70.

The storage corner block 64 preferably has a diagram 120 thereon showing the true size of the actual cabinet which it represents. This storage corner block 64 may be supplemented by a top storage corner block 122 shown in Figure 22 and the wall corner block 124 shown in Figure 21. The block 124 may be used in the corner 44 instead of using the side wall members 70 beneath the block 64 or where the installation is to represent a built-in cabinet structure with a plastered wall extending from the tops of the cabinets to the ceiling, the wall 124 may be used above the block 64 and side wall blocks 70 may be used above the cabinets 48, 60, 62, 66 and 68 for pictorial effect.

Aside from the storage cabinets 60, 62, 66, 104 and 106 of different widths, blocks of different heights may also be used, as for instance the blocks 126 and 128 shown in Figure 23. These may be arranged as illustrated so that the block 126 of 48 inch height may be used alongside a storage section 130 of ordinary or 32 inch height (which is the height of the storage sections 60, 62, 64, 66, 104 and 106). A top storage section 132 may then be placed on top of the storage section 130 to make the height of the sections 130 and 132 equal to the section 126. The taller storage section 128 may then be placed alongside the section 126 or the sections 130 and 132 as clearly shown and will reach from the top of the lower sections to the top of the sections with the side wall blocks 70 interposed between the blocks 126 and 130 and the lower sections 50 and 134.

It will be noted that the graduated scales 38 start with the indicium 2 at less than a two foot distance on the scale from the wall corner 44. This is to compensate for the difference between the actual thickness or depth of the blocks used in the set and the depth represented by the blocks added to the depths of the corner blocks. The scales 38 are used only when the corner blocks are used. For instance, in the actual installation of the cabinets the lower horizontal edge of the corner cabinet (considering the cabinets as viewed in Figure 2) and the depth of the cabinet represented by the block 54 would project in a left hand direction a distance of 22 inches from the right hand wall, while actually in the demonstration set to scale, the blocks 52 and 54 project about 2 inches. The upper horizontal edge or depth of the corner cabinet would project in a left hand direction a distance of 34 inches, while actually in the demonstration set to scale the block 52 projects about 12 inches. The scale 38 is therefore graduated so that the left vertical edge of the block 52 coincides with the 34 inch position on the scale. When the corner blocks 52, 122 and 124 are used, the scales 38 only are used for all cabinet installations to indicate the aggregate thickness of the corner block and the widths of the flat blocks placed edge to edge thereagainst and for placing of the cards 26, 30, 72 and 74 when the corner blocks are used.

The scales 42 begin with zero at the wall corner 44 and may be used for placing the blocks and cards (when the corner blocks 52, 64, 122 and 124 are not used) and to indicate the aggregate widths of the flat blocks when placed edge to edge starting at the corner of the room.

From the foregoing description it will be seen that I have provided a demonstration set whereby a demonstrator may lay out in a pictorial arrangement, a system of cabinets of various characteristics and widths, and a view of these may be had with respect to the objects already in or forming a part of a kitchen or the like, and that the set may be used for accurately determining just what cabinets will fit in the various wall spaces provided.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a demonstration set of the character disclosed, a device representing a portion of a room and comprising a pair of wall members at right angles to each other, a floor member spanning the distance between the bottom edges of said wall members, a plurality of cards representing doors, windows, and other objects adapted to be placed against said wall members to represent constructional details of the room, and a plurality of blocks adapted to be placed against said wall members and overlapping said cards, said blocks representing cabinets whereby a pictorial view of a room, its characteristics and such cabinets on a miniature scale may be set up.

2. In a demonstration set of the character disclosed, a device representing a portion of a room and comprising a pair of wall members at right angles to each other, a floor member spanning the distance between the bottom edges of said wall members, means for tipping said device whereby the wall members thereof slant upwardly and outwardly from said floor member, and a plurality of thin blocks adapted to be placed against said wall members, said blocks representing objects whereby a pictorial view of room and objects may be set up said blocks normally remaining against said wall members due to the slant thereof.

3. In a demonstration set of the character disclosed, a device representing a portion of a room and comprising a pair of wall members at right angles to each other, a floor member spanning the distance between the bottom edges of said wall members, and a plurality of blocks adapted to be placed against said wall members, said blocks representing objects of greater proportional depth than the blocks themselves whereby however a pictorial view of room and objects may be set up, some of said blocks being thicker than others to represent objects of different proportional depths.

4. In a demonstration set of the character disclosed, a miniature device representing two walls and the floor of a room, a plurality of miniature blocks to be placed against said walls, said miniature blocks representing built-in wall cabinets of various heights, widths, depths and constructional characteristics, whereby a pictorial view of room with such cabinets on a miniature scale may be set up with the blocks obscuring portions of the wall thereby giving the built-in appearance desired.

5. In a demonstration set of the character disclosed, a device representing a portion of a room, a plurality of blocks to be placed against the wall thereof, said blocks representing cabinets of various heights, widths, depths and constructional characteristics, said room being cross lined to scale, said blocks being to one scale with the exception of their depth which is to another and reduced scale and graduated scales on the surface of said device whereby the blocks may placed in desired positions with respect to the corner of the represented room and aggregate sizes may be determined.

6. In a demonstration set of the character disclosed, a device representing a portion of a room, and a plurality of blocks to be placed against said device said blocks representing cabinets of various heights, widths, depths and constructional characteristics, said blocks being to scale with the exception of their depths, one of said blocks being for the corner of the represented room, a graduated scale and indicia therefor on the surface of said device, one of said scales starting from zero in the corner of the room and the other being of identical ratio but having the difference between the represented depth and the actual depth of the corner block subtracted from the beginning of the scale.

7. A demonstration set comprising a device representing a room and a plurality of blocks to scale except as to depth and representing cabinets of various heights, widths and constructional characteristics and also representing cabinets of two depths adapted to be arranged against the represented walls of said device, corner blocks of substantially triangular shape and a pair of graduated scales on said device, one being arranged to indicate the aggregate widths of said blocks and the other one to indicate the aggregate depth of the corner blocks added to the widths of the other blocks.

8. In a demonstration set of the character disclosed, a device representing a wall and the floor of a room, a plurality of blocks to be placed on said floor and against said wall, said blocks representing cabinets of various heights, widths, depths and constructional characteristics whereby a pictorial view of a room and objects may be set up, and blank wall space blocks to be positioned between cabinet blocks which are vertically spaced from each other whereby the upper cabinet blocks are supported by the lower cabinet blocks and the blank wall space blocks.

9. In a demonstration set, a wall member, a plurality of blocks representing cabinets of various heights and widths to one scale, said blocks being of a depth to a different and reduced scale, a corner block for use in conjunction with said plurality of blocks, and a pair of graduated scales associated with said wall member, one of said scales compensating for the depth to a reduced scale of said blocks when said corner block is used.

10. In a demonstration set, a wall member, a plurality of blocks representing cabinets of various heights and widths to one scale, said blocks being of a depth to a different and reduced scale, a corner block for use in conjunction with said plurality of blocks, and a pair of graduated scales associated with said wall member, one of said scales compensating for the depth to a reduced scale of said blocks when said corner block is used and of identical ratio with the other scale of said pair of scales except having the difference between the represented depth and actual depth of the corner block subtracted from the beginning of the scale.

SAMUEL S. COOK.